United States Patent
Park et al.

(10) Patent No.: US 11,362,905 B2
(45) Date of Patent: Jun. 14, 2022

(54) METHOD AND DEVICE FOR RECEIVING DATA FROM A PLURALITY OF PERIPHERAL DEVICES

(71) Applicant: AGENCY FOR DEFENSE DEVELOPMENT, Daejeon (KR)

(72) Inventors: Sang Cheon Park, Seoul (KR); Eun Jeong Jeong, Seoul (KR); Seong Lyun Kim, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 332 days.

(21) Appl. No.: 16/605,497

(22) PCT Filed: May 7, 2019

(86) PCT No.: PCT/KR2019/005391
§ 371 (c)(1),
(2) Date: Oct. 15, 2019

(87) PCT Pub. No.: WO2020/045791
PCT Pub. Date: Mar. 5, 2020

(65) Prior Publication Data
US 2021/0377127 A1    Dec. 2, 2021

(30) Foreign Application Priority Data

Aug. 29, 2018   (KR) .................. 10-2018-0102178

(51) Int. Cl.
*H04L 41/142*     (2022.01)
*H04L 67/12*      (2022.01)
(Continued)

(52) U.S. Cl.
CPC ............ *H04L 41/142* (2013.01); *G16Y 30/00* (2020.01); *G16Y 40/35* (2020.01); *H04L 67/12* (2013.01)

(58) Field of Classification Search
CPC ........ G06N 20/00; G06N 7/005; G06N 5/045; G06N 5/02; G06N 7/02; H04L 63/1425;
(Continued)

(56) References Cited

U.S. PATENT DOCUMENTS 10,911,318 B2    2/2021  Gopalakrishnan et al.
2004/0199368 A1* 10/2004  Bechhoefer ........ G05B 23/0235
                                                         703/7
(Continued)

FOREIGN PATENT DOCUMENTS

CN         103336906         10/2013
CN         103974311          8/2014
(Continued)

OTHER PUBLICATIONS

International Search Report for PCT/KR2019/005391 dated Aug. 22, 2019 and its English translation from Google Translate.
(Continued)

*Primary Examiner* — Tonia L Dollinger
*Assistant Examiner* — Linh T. Nguyen
(74) *Attorney, Agent, or Firm* — Ladas & Parry, LLP

(57) ABSTRACT

Provided are a data receiving method and device to increase a probability of receiving normal data from a plurality of peripheral devices. A data receiving method of a device includes receiving current data from any one peripheral device of a plurality of peripheral devices, determining whether the received current data is normal data, calculating a probability that next data is normal data, on the basis of a result of the determination, and determining whether to receive the next data according to the calculated probability, in which the next data is data transmitted by the any one peripheral device or another peripheral device.

13 Claims, 4 Drawing Sheets

(51) Int. Cl.
*G16Y 30/00* (2020.01)
*G16Y 40/35* (2020.01)

(58) Field of Classification Search
CPC ............ H04L 63/1466; H04L 63/1433; H04L 63/1416; H04L 2463/141; H04L 41/142; H04L 63/145; H04L 41/0631; H04L 43/16; H04L 67/12; H04W 24/10; H04W 4/38; H04W 4/70; G16Y 30/00
See application file for complete search history.

(56) References Cited

U.S. PATENT DOCUMENTS

| | | | | |
|---|---|---|---|---|
| 2010/0141423 | A1* | 6/2010 | Lin | G08B 25/10 340/539.1 |
| 2013/0054162 | A1* | 2/2013 | Smith | H02J 13/00 702/59 |
| 2013/0054183 | A1 | 2/2013 | Afzal et al. | |
| 2015/0161394 | A1* | 6/2015 | Ferragut | G06F 21/57 726/25 |
| 2017/0364818 | A1* | 12/2017 | Wu | G06F 11/0754 |
| 2019/0220376 | A1* | 7/2019 | Wang | G06F 11/1076 |
| 2019/0236114 | A1* | 8/2019 | Li | G06K 9/6262 |
| 2019/0303567 | A1* | 10/2019 | Batmaz | G06N 3/0454 |
| 2019/0370610 | A1* | 12/2019 | Batoukov | G06F 11/0793 |
| 2020/0302353 | A1* | 9/2020 | Tang | G06Q 50/02 |
| 2020/0374720 | A1* | 11/2020 | Li | H04W 4/38 |

FOREIGN PATENT DOCUMENTS

| | | |
|---|---|---|
| CN | 106844161 | 6/2017 |
| CN | 107409075 | 11/2017 |
| JP | 2015-108990 | 6/2015 |
| KR | 10-2014-0111396 | 9/2014 |
| KR | 10-2016-0026645 | 3/2016 |
| KR | 10-1599311 | 3/2016 |
| KR | 10-2018-0072318 | 6/2018 |

OTHER PUBLICATIONS

Written Opinion of the International Searching Authority for PCT/KR2019/005391 dated Aug. 22, 2019 and its English translation by Google Translate.
Office Action dated Jan. 5, 2022 for Chinese Patent Application No. 201980002304.2 and its English translation provided by the Applicant's foreign counsel.

* cited by examiner

METHOD AND DEVICE FOR RECEIVING DATA FROM A PLURALITY OF PERIPHERAL DEVICES

CROSS-REFERENCE TO RELATED APPLICATIONS

This application is the U.S. National Stage of International Patent Application No. PCT/KR2019/005391 filed on May 7, 2019, which claims the priority to Korean Patent Application No. 10-2018-0102178 filed on Aug. 29, 2018, the entire contents of which are incorporated herein by reference.

TECHNICAL FIELD

The present disclosure relates to a method of receiving data, and more particularly, to a data receiving method to increase a probability of receiving normal data from a plurality of peripheral devices.

BACKGROUND ART

Internet of things (IoT) is a technology to connect a device to the Internet by including a sensor and a communication function in the device, and signifies a technology to connect a plurality of devices through wireless communication.

As its name implies, IoT may be applied to all objects. However, for devices operated by an independent power source, such as mobile devices, resources may be limited and thus in such an IoT environment targeting the devices should consider various environmental specialties such as computing power, memory capacity, or battery power.

In the IoT environment, abnormal data may be diffused in a data transceiving process among a plurality of devices. To prevent the above, according to the related art, reliability information needs to be updated for each unit hour and to be exchanged. In the above method, as the number of devices increases, the time and resources used for replacing the reliability information increase.

DESCRIPTION OF EMBODIMENTS

Technical Problem

Provided is a method of preventing diffusion of abnormal data among a plurality of devices.

Furthermore, provided is a method of preventing an inflow of abnormal data from a plurality of peripheral devices and reducing resources consumed in a device even when the number of peripheral devices increases.

Furthermore, provided is a method of preventing an inflow of abnormal data in advance before data is received from peripheral devices.

The technical problem to be solved by the present disclosure is not limited to the above-mentioned technical problems, and other technical problems not mentioned above may be clearly understood by those skilled in the art from the following description.

Solution to Problem

According to an aspect of the present disclosure, a device for receiving data from a plurality of peripheral devices includes a data receiving unit configured to receive current data from any one peripheral device of the plurality of peripheral devices, a data determination unit configured to determine whether the received current data is normal data, a data prediction unit configured to calculate a probability that next data is normal data, on the basis of a result of the determination, and a data receiving determination unit configured to determine whether to receive the next data according to the calculated probability, in which the next data is data transmitted by the any one peripheral device or another peripheral device.

According to an aspect of the present disclosure, a data receiving method of a device includes receiving current data from any one peripheral device of a plurality of peripheral devices, determining whether the received current data is normal data, calculating a probability that next data is normal data, on the basis of a result of the determination, and determining whether to receive the next data according to the calculated probability, in which the next data is data transmitted by the any one peripheral device or another peripheral device.

Advantageous Effects of Disclosure

According to the present disclosure, the next data may be selectively received according to a probability that the next data is normal data, and unconditionally receiving the next data is not presumed. Accordingly, abnormal data may be prevented from inflowing into a device and being diffused therein.

Furthermore, according to the present disclosure, without determining whether to receive data one-to-one between a reference device and any one peripheral device, it is determined whether the reference device receives data transmitted from a plurality of peripheral devices. Accordingly, even when the number of peripheral devices increases, the resource consumed to determine whether to receive data may be maintained constant.

The effects according to the present disclosure are not limited by the contents exemplified above, and more various effects are included in the specification.

BEST MODE

Figure 1:
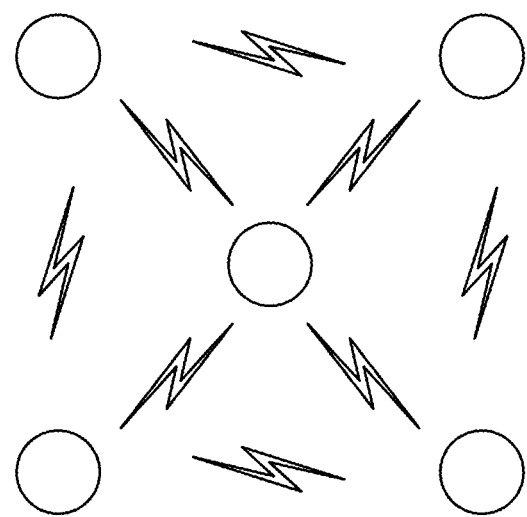
FIG. 1 illustrates a plurality of devices to which a data receiving method according to an embodiment is applied.

A device for receiving data from a plurality of peripheral devices includes a data receiving unit configured to receive current data from any one peripheral device of the plurality of peripheral devices, a data determination unit configured to determine whether the received current data is normal data, a data prediction unit configured to calculate a probability that next data is normal data, on the basis of a result of the determination, and a data receiving determination unit configured to determine whether to receive the next data according to the calculated probability, in which the next data is data transmitted by the any one peripheral device or another peripheral device.

The data determination unit may determine whether the current data is normal data by comparing the current data with previously received data.

The data determination unit may determine the current data to be abnormal data when the current data is defective data that needs recovery.

The data prediction unit may calculate a probability $\Phi(t+1)$ that the next data is normal data by an equation, $$\Phi(t+1)=\min\{1, a*\Phi(t)*\exp(\Theta_1)+(1-a)*\Phi(t)*\exp(\Theta_2)\}$$

where $\Phi(t)$ is a probability that the current data is normal data, $\theta_1$ is a first coefficient to adjust an increase rate of $\Phi(t+1)$ of $\Phi(t)$, $\theta_2$ is a second coefficient to adjust a decrease rate of $\Phi(t+1)$ to $\Phi(t)$, and "a" is a third coefficient having a value of 1 when the data determination unit determines the current data to be normal data, and a value of 0 when the data determination unit determines the current data to be abnormal data.

The first coefficient $\theta_1$ may be a positive value, and the second coefficient $\theta_2$ may be a constant having a negative value.

The first coefficient $\theta_1$ may be a value selected to have a maximum reward according to a learning that gives a reward when normal data is received from the plurality of peripheral devices.

The data receiving determination unit may determine to receive the next data when the calculated probability has a value greater than or equal to a reference value, or otherwise not to receive the next data, and the reference value may be a value randomly generated in a range from 0 to 1 each time when the data receiving determination unit determines whether to receive the next data.

The data prediction unit, when the data receiving determination unit determines not to receive the next data, may set a probability that data after the next data is normal data to be identical to a probability that the next data is normal data.

The data receiving unit may perform a communication directly with the plurality of peripheral devices.

The device may perform communication with the plurality of peripheral devices in an IoT environment.

A data receiving method of a device includes receiving current data from any one peripheral device of a plurality of peripheral devices, determining whether the received current data is normal data, calculating a probability that next data is normal data, on the basis of a result of the determination, and determining whether to receive the next data according to the calculated probability, in which the next data is data transmitted by the any one peripheral device or another peripheral device.

In the above-described method, a probability $\Phi(t+1)$ that the next data is normal data is calculated by an equation, $$\Phi(t+1)=\min\{1, a*\Phi(t)*\exp(\Theta_1)+(1-a)*\Phi(t)*\exp(\Theta_2)\}$$

where $\Phi(t)$ is a probability that the current data is normal data, $\theta_1$ is a first coefficient to adjust an increase rate of $\Phi(t+1)$ of $\Phi(t)$, $\theta_2$ is a second coefficient to adjust a decrease rate of $\Phi(t+1)$ to $\Phi(t)$, and "a" is a third coefficient having a value of 1 when the data determination unit determines the current data to be normal data, and a value of 0 when the data determination unit determines the current data to be abnormal data.

The data receiving method may further include calculating the first coefficient $\theta_1$ by performing a learning that gives a reward when normal data is received from the plurality of peripheral devices.

In the above-described method, the calculating of the first coefficient $\theta_1$ may include a first operation of setting a value of the first coefficient $\theta_1$, a second operation of sequentially receiving data from a plurality of peripheral devices, with respect to the set first coefficient $\theta_1$, and performing an episode of giving a reward when the received data is normal data and a penalty when the received data is abnormal data, a third operation of producing a score by integrally calculating the reward and the penalty, a fourth operation of repeating a process from the first operation to the third operation multiple times, and a fifth operation of outputting a value of the first coefficient $\theta_1$ set at a state when an optimal score is produced for the episode, among a plurality of states.

In the above-described method, the device ma perform communication with the plurality of peripheral devices in an IoT environment.

MODE OF DISCLOSURE

The present disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

Terms such as "include" or "comprise" may not be construed to necessarily include any and all constituent elements or steps described in the specification, but may be construed to exclude some of the constituent elements or steps or further include additional constituent elements or steps.

The terms used in the present disclosure have been selected from currently widely used general terms in consideration of the functions in the present disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the present disclosure are defined based on their meanings in relation to the contents discussed throughout the specification, not by their simple meanings.

FIG. 1 illustrates a plurality of devices to which a data receiving method according to an embodiment is applied.

A plurality of devices 100 are devices capable of performing Internet communication with each other and may include various devices such as home appliances, automobiles, or smartphones. In other words, the devices 100 may be IoT-connected devices.

The devices 100 may be able to exchange data through direct communication without a server or a router. The devices 100 may use a wired/wireless communication method, for example, Wi-Fi, Bluetooth, wireless personal area networks (WPAN), long term evolution (LTE), Ethernet, ZigBee, or Z-Wave.

Figure 2:
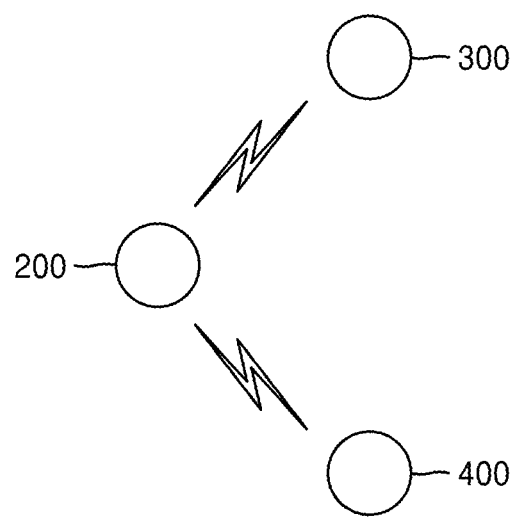
FIG. 2 illustrates a reference device according to an embodiment and a plurality of peripheral devices.
Figure 3:
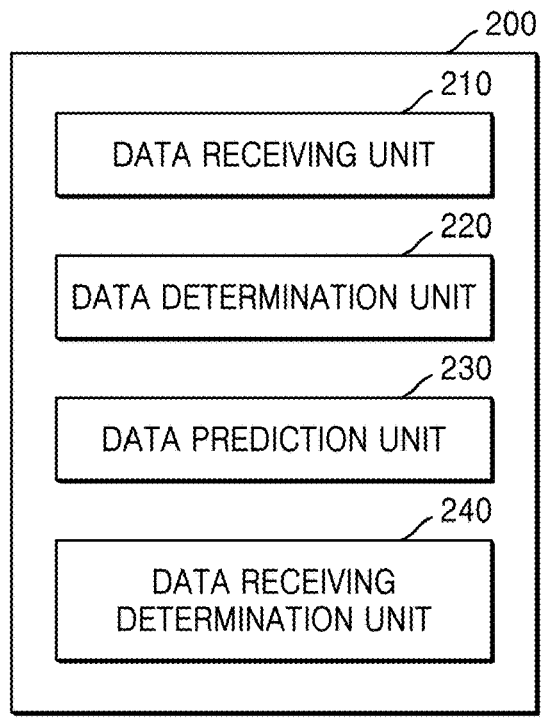
FIGS. 3 and 4 are block diagrams of a configuration of a reference device according to an embodiment.
Figure 4:
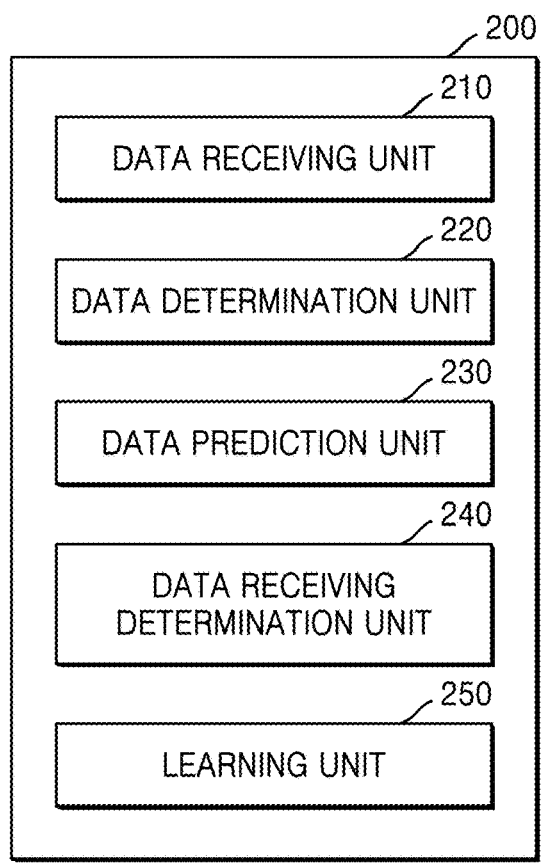
Figure 5:
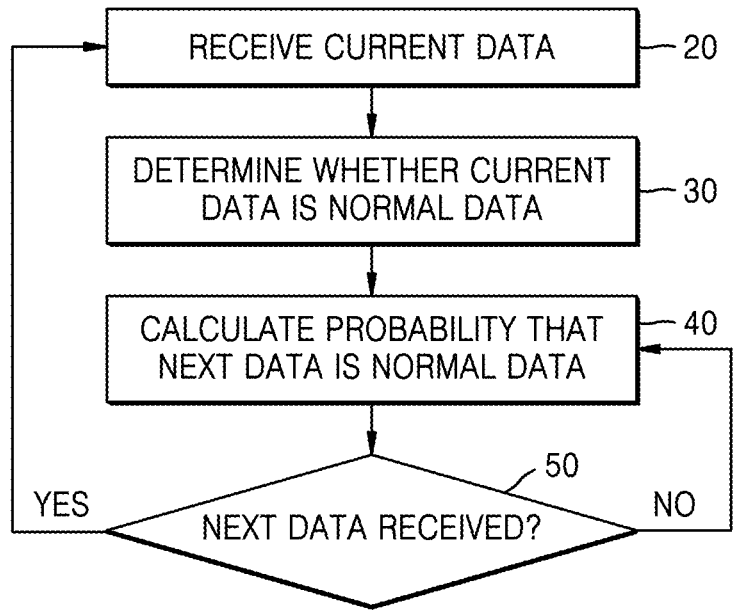
FIGS. 5 and 6 are block diagrams of a data receiving method according to an embodiment.
Figure 6:
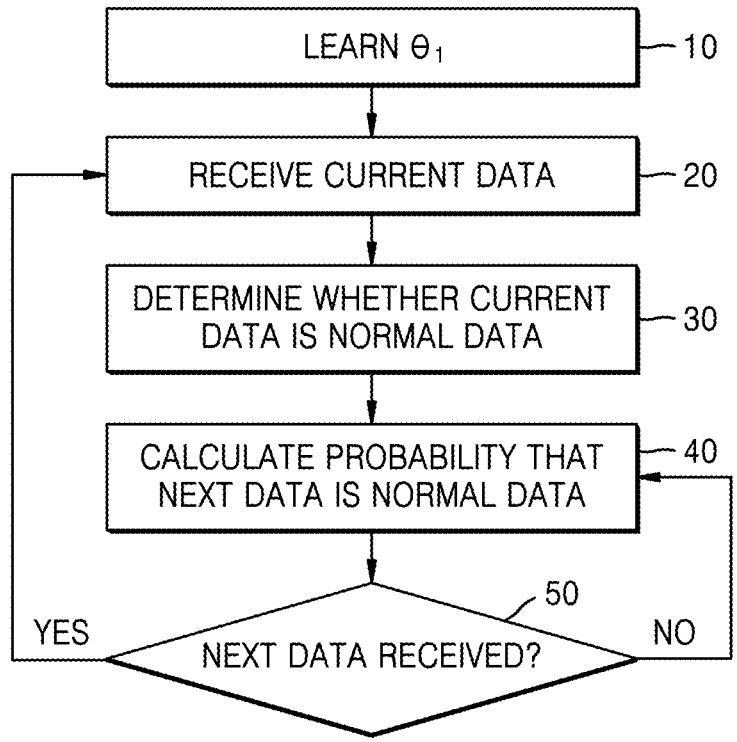

FIG. 2 illustrates a reference device according to an embodiment and a plurality of peripheral devices. FIGS. 3 and 4 are block diagrams of a configuration of a reference device according to an embodiment. FIGS. 5 and 6 are block diagrams of a data receiving method according to an embodiment. In the following description, referring to FIGS. 2 to 6, a configuration of a reference device and a data receiving method are described.

To describe a data receiving method according to an embodiment of the present disclosure, it is assumed that a reference device 200 receives data from two peripheral devices 300 and 400. This is for convenience of explanation and the number of peripheral devices is not limited thereto, and the peripheral devices may include three or more devices different from the assumption. Furthermore, for convenience of explanation, a device is selected as the reference device 200 to describe the data receiving method, and a configuration of a device and a data receiving method described below may be applied not only to the reference device 200, but also to a plurality of peripheral devices.

First, in a configuration of the reference device 200, the reference device 200 may include a data receiving unit 210, a data determination unit 220, a data prediction unit 230, and a data receiving determination unit 240.

The data receiving unit 210 may perform a function of receiving data from the peripheral devices 300 and 400. When the data receiving determination unit 240 determines to receive data, the data receiving unit 210 may use the determination as a trigger so as to receive data from the peripheral devices 300 and 400.

When only the peripheral device 300 that is any one of the peripheral devices 300 and 400 receives data, the data receiving unit 210 may receive the data. Alternatively, when both the peripheral devices 300 and 400 simultaneously receive data, the data receiving unit 210 may receive the data by selecting any one of the peripheral devices 300 and 400.

The data determination unit 220 may determine whether the current data received through the data receiving unit 210 is normal data.

The data determination unit 220 may compare the received current data with previously collected data and may determine the received current data to be abnormal data when the received current data is different from a pattern of the previously collected data. A value included in data or a data receiving frequency may be used as a pattern for comparison with the previously collected data.

Alternatively, when the received data is defective data, the data determination unit 220 may determine the received data to be abnormal data. The defective data may signify data that is damaged to be unusable and needs recovery.

The data prediction unit 230 may predict a probability that the next data is normal data on the basis of a result of the determination by the data determination unit 220. In this state, the next data may be data transmitted by the peripheral device that transmitted the current data, or data transmitted by another peripheral device, after the current data.

In other words, as the next data may include all pieces of data transmitted by a plurality of peripheral devices, the reference device may determine whether to receive data from a plurality of peripheral devices, not determining whether to receive data one-to-one from any one peripheral device. Accordingly, even when the number of peripheral devices increases, resources consumed to determine whether to receive data may be maintained constant.

A probability $\Phi(t+1)$ that the next data is normal data may be calculated through Equation 1 below.

$$\Phi(t+1)=\min\{1, a*\Phi(t)*\exp(\Theta_1)+(1-a)*\Phi(t)*\exp(\Theta_2)\} \quad \text{[Equation 1]}$$

In Equation 1, $\Phi(t)$ is a probability that the received current data is normal data, which is a probability calculated on the basis on a probability $\Phi(t-1)$ that the previous data is normal data, before the data prediction unit 230 receives the current data.

$\theta_1$ denotes a coefficient to adjust an increase rate of $\Phi(t+1)$ to $\Phi(t)$. $\theta_1$, which indicates an increase rate, may be a constant having a positive value. $\theta_1$ may be set to a constant. Alternatively, before the reference device 200 starts receiving data, $\theta_1$ may be determined by performing learning in advance through a learning unit 250. A method of learning $\theta_1$ is described below with reference to FIG. 7.

$\theta_2$ denotes a coefficient to adjust a decrease rate of $\Phi(t+1)$ to $\Phi(t)$. $\theta_2$, which indicates a decrease rate, may be a constant having a negative value. Alternatively, $\theta_2$ may be a coefficient determined through learning like $\theta_1$.

"a" denotes a coefficient having a value of 1 when the data determination unit 220 determines the received current data to be normal data, and having a value of 0 when the received current data is determined to be abnormal data.

The data prediction unit 230 may predict a probability that the next data is normal data, on the bases of a result of the above determination performed by the data determination unit 220 with respect to the current data. When the data receiving determination unit 240 determines not to receive the next data, the data prediction unit 230 may set a probability $\Phi(t+2)$ that data after the next data is normal data, to a certain value or the probability $\Phi(t+1)$ that the next data is normal data.

The data receiving determination unit 240 may determine whether to receive the next data, on the basis of the probability $\Phi(t+1)$ that the next data is normal data, which is calculated by the data prediction unit 230.

To this end, the data receiving determination unit 240 may compare the calculated value of $\Phi(t+1)$ with a reference value, and then determine to receive the next data when the value of $\Phi(t+1)$ is greater than or equal to the reference value, or otherwise not to receive the next data.

The reference value may be a value randomly selected in a range from 0 to 1. In a method of randomly selecting the reference value, various random variants such as a uniform random variant or a Gaussian random variant may be used.

As such, as the next data is selectively received on the basis of a result of the determination by the data receiving determination unit 240, the next data may not be unconditionally received. Accordingly, the inflow and diffusion of abnormal data in a device may be prevented.

Next, a method of receiving data from the peripheral devices 300 and 400 in the reference device 200 is described.

When $\theta_1$ is set to a certain constant, whether to receive data may be determined by using the set $\theta_1$ according to a method illustrated in FIG. 5.

Alternatively, as illustrated in FIG. 6, after $\theta_1$ is set according to a learning algorithm before receiving data, whether to receive data may be determined by using the set $\theta_1$. As FIGS. 5 and 6 are different only in that whether an operation of learning $\theta_1$ is included, in the following description, a data receiving method is described on the basis of FIG. 6.

First, in operation 10, the learning unit 250 may learn $\theta_1$ as a preparatory work before data receiving. To learn $\theta_1$, the reference device 200 may receive data from the peripheral devices 300 and 400 and may perform an episode that is rewarded, when normal data is received. For such a learning method, reinforcement learning such as Q-learning or deep Q-networks (DQN) may be used.

Figure 7:
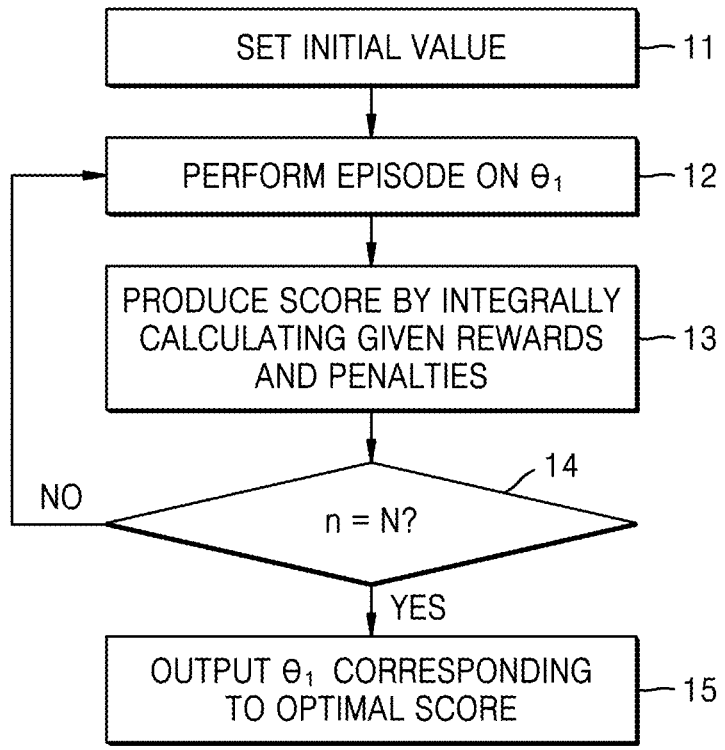
FIG. 7 is a flowchart for describing an embodiment of a method of learning $\theta_1$.

FIG. 7 is a flowchart for describing an embodiment of a method of learning $\theta_1$. To discuss operation 10 in detail, a method of learning $\theta_1$ is described with reference to FIG. 7.

A certain episode may be employed to learn $\theta_1$. The certain episode may include K states, and in each state, considering the characteristics of the peripheral devices 300 and 400, the peripheral devices 300 and 400 may be configured to arbitrarily transmit normal data or abnormal data.

For example, the K states may be configured as shown in Table 1 below.

TABLE 1

| State | 1 | 2 | 3 | 4 | ... | K |
|---|---|---|---|---|---|---|
| First peripheral device 300 | normal | — | normal | abnormal | ... | normal |
| Second peripheral device 400 | abnormal | abnormal | abnormal | — | ... | — |

In this state, when the peripheral devices 300 and 400 both transmit data in one state, the reference device 200 may randomly select and receive any one piece of data only. When a certain episode is selected, in operation 11, initial values of $\theta_1$ and $\Phi(0)$ may be selected to learn Di. As $\theta_1$ works as a factor to increase a receiving probability with respect to the next data, basically, a constant having a positive value may be selected as $\theta_1$. For example, the initial values may be selected such that $\theta_1=0.2$ and $\Phi(0)=1$.

In operation 12, Equation 2 may be applied to the selected initial values.

$$\Phi(k+1)=\min\{1, a*\Phi(k)*\exp(\Theta_1)+(1-a)*\Phi(k)*\exp(\Theta_2)\} \quad [\text{Equation 2}]$$

In Equation 2, $\Phi(k+1)$ denotes a probability that data received in a (k+1)th state is normal data.

$\Phi(k)$ denotes a probability that data received in a k-th state is normal data.

$\theta_2$ denotes a coefficient to adjust a decrease rate of $\Phi(k+1)$ to $\Phi(k)$. For example, $\theta_2$ may be set to a constant having a negative value, such as, −0.5.

"a" denotes a coefficient having a value of 1 when the data received at the k-th state is normal data, and having a value of 0 when the received data is abnormal data.

In operation 12, the learning unit 250 calculates a probability that the data received in the (k+1)th state according to Equation 2 is normal data and determines whether to receive data in the (k+1)th state according to the calculated probability.

The learning unit 250 may determine to receive data in the (k+1)th state when the calculated probability is greater than or equal to the reference value, or otherwise not to receive data. In this state, the reference value may be a value randomly selected in a range from 0 to 1. In a method of randomly selecting the reference value, various random variants such as a uniform random variant or a Gaussian random variant may be used.

In operation 12, the learning unit 250 may perform the episode to the K-th state and may give a reward or penalty according to a result of the receiving of data in each state.

A reward may be given when the received data is actual normal data (case 1) or when data that is not received is actual abnormal data (case 2).

A penalty may be given when the received data is actual abnormal data (case 3) or when data that is not received is actual normal data (case 4).

Table 2 below shows an embodiment of given rewards and penalties.

TABLE 2

| State | 1 | 2 | 3 | 4 | ... | N |
|---|---|---|---|---|---|---|
| First peripheral device 300 | normal | — | normal | abnormal | ... | normal |
| Second peripheral device 400 | abnormal | abnormal | abnormal | — | ... | — |
| Reward | 5 | | | 2 | ... | 5 |
| Penalty | | −3 | −1 | | ... | |

Referring to Table 2, in the first state, when data is received from the first peripheral device 300, a reward is given because the received data is actual normal data. Furthermore, in the second state, when data is received from the second peripheral device 400, a penalty is given because the received data is actual abnormal data. Furthermore, in the third state, when no data is received from the first peripheral device 300, a penalty is given because data that is not received is actual normal data. Furthermore, in the fourth state, when no data is received from the first peripheral device 300, a reward is given because data that is not received is actual abnormal data. In this state, the reward given when the received data is actual normal data (case 1) may be greater than the reward given when data that is not received is actual abnormal data (case 2). Furthermore, the penalty given when the received data is actual abnormal data (case 3) may be greater than the penalty given when data that is not received is actual normal data (case 4).

In operation 13, the learning unit 250 may produce a score by integrally calculating the given rewards and penalties.

In operation 14, the learning unit 250 may increase the value of $\theta_1$ and repeat a certain episode N times. For example, $\theta_1$ may be set to increase by 0.01 for each episode.

In operation 15, the learning unit 250 may select an episode having an optimal score for the N-time performed episode and output a value of $\theta_1$ set in the selected episode.

For example, the score calculated from the N-time performed episode may be shown in Table 3 below.

TABLE 3

| Episode | $\theta_1$ set value | Score |
|---|---|---|
| 1$^{st}$ time | 0.2 | 17 |
| 2$^{nd}$ time | 0.21 | 25 |
| 3$^{rd}$ time | 0.22 | 38 |
| ... | ... | ... |
| N$^{th}$ time | 0.6 | 23 |

Referring to Table 3, when the score of 38 calculated at the third episode is the highest score, the learning unit 250 may output 0.22 that is a value set at the episode, as the value of $\theta_1$. The value of $\theta_1$ may be selected by the learning unit 250 according to the above description with reference to FIG. 7.

Next, in operation 20, the data receiving unit 210 may receive the current data from the peripheral devices 300 and 400. The current data may be data received from the peripheral device 300 that is any one of the peripheral devices 300 and 400.

In operation 30, the data determination unit 220 may determine, through the data receiving unit 210, whether the received current data is normal data. To this end, the data determination unit 220 may compare the previously collected data with the received current data and determine the received current data to be abnormal data when the received current data is different from a pattern of the previously collected data. A value included in data or a data receiving frequency may be used as a pattern for comparison with the previously collected data.

Alternatively, when the received data is defective, the data determination unit 220 may determine the received data to be abnormal data. The defective data may signify data that is damaged to be unusable and needs recovery.

In operation 40, the data prediction unit 230 may predict a probability that the next data is normal data on the basis of a result of the determination by the data determination unit 220. In this state, the next data may be data transmitted by any one peripheral device, for example, the peripheral device 300 that transmitted the current data, or data transmitted by another peripheral device, for example, the peripheral device 400, after the peripheral device 300 transmits the current data.

In other words, as the next data may include all pieces of data transmitted by a plurality of peripheral devices, the reference device may determine whether to receive data from a plurality of peripheral devices, not determining whether to receive data one-to-one from any one peripheral device. Accordingly, even when the number of peripheral devices increases, resources consumed to determine whether to receive data may be maintained constant.

The probability $\Phi(t+1)$ that the next data is normal data may be calculated through Equation 3.

$$\Phi(t+1)=\min\{1, a^*\Phi(t)^*\exp(\Theta_1)+(1-a)^*\Phi(t)^*\exp(\Theta_2)\} \quad \text{[Equation 3]}$$

In Equation 3, $\Phi(t)$ denotes a probability that the received current data is normal data, which is a probability calculated on the basis on the probability $\Phi(t-1)$ that the previous data is normal data, before the data prediction unit 230 receives the current data.

$\theta_1$ denotes a coefficient to adjust an increase rate of $\Phi(t+1)$ to $\Phi(t)$, which may be a value set in advance by reinforcement learning in the learning unit 250 according to the description with reference to FIG. 7. In an embodiment with reference to FIG. 7, $\theta_1$ is set to 0.22. $\theta_1$ that is suitable for an environment in which a reference device is operated by the reinforcement learning may be set in advance, and accordingly, a probability of receiving normal data from the peripheral devices may be improved. $\theta_2$ denotes a coefficient to adjust a decrease rate of $\Phi(t+1)$ to $\Phi(t)$. $\theta_2$ may be a constant having a negative value that is arbitrarily determined.

"a" denotes a coefficient having a value of 1 when the data determination unit 220 determines the received current data to be normal data, and having a value of 0 when the received current data is determined to be abnormal data.

Figure 8:
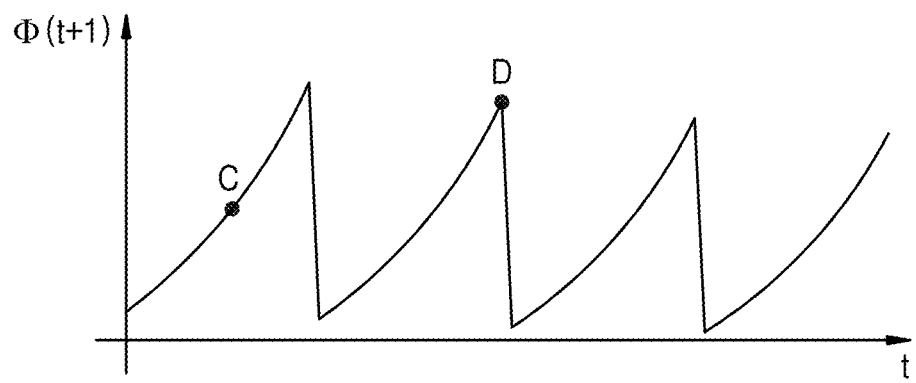
FIG. 8 is a graph showing an embodiment of $\Phi(t+1)$.

The opening of the probability $\Phi(t+1)$ calculated according to Equation 3 may be shown in FIG. 8. A point C is a point when the current data is determined to be normal data, and a point D is a point when the current data is abnormal data.

As "a" has a value of 1 at the point C, Equation 3 is summarized to Equation 4 below.

$$\Phi(t+1)=\min\{1,\Phi(t)^*\exp(\Theta_1)\} \quad \text{[Equation 4]}$$

As $\theta_1$ has a positive value, a graph of the probability $\Phi(t+1)$ at the point C appears to be a rising curve.

As "a" has a value of 0 at the point D, Equation 3 is summarized to Equation 5 below.

$$\Phi(t+1)=\min\{1,\Phi(t)^*\exp(\Theta_2)\} \quad \text{[equation 5]}$$

As $\theta_2$ has a negative value, a graph of the probability $\Phi(t+1)$ at the point D appears to be a falling curve.

In operation 50, the data receiving determination unit 240 may determine whether to receive the next data, on the basis of the probability $\Phi(t+1)$ that the next data is normal data, which is calculated by the data prediction unit 230.

To this end, the data receiving determination unit 240 may compare the calculated value of $\Phi(t+1)$ with the reference value, and determine to receive the next data when the value of $\Phi(t+1)$ is greater than or equal to the reference value, or otherwise not to receive the next data.

In this state, the reference value may be a value randomly selected in a range from 0 to 1. In a method of randomly selecting the reference value, various random variants such as a uniform random variant or a Gaussian random variant may be used.

When the data receiving determination unit 240 determines to receive the next data, the data receiving unit 210 receives the next data and repeats a process from operation 20 to operation 50.

Alternatively, when the data receiving determination unit 240 determines not to receive the next data, the data receiving unit 210 does not receive the next data. In this case, the data prediction unit 230 may set the probability $\Phi(t+2)$ that data after the next data is normal data, to be a certain value or the probability $\Phi(t+1)$ that the next data is normal data.

As such, in the data receiving method according to the present disclosure, the next data may be selectively received according to the probability that the next data is normal data, and unconditionally receiving the next data is not presumed. Accordingly, abnormal data may be prevented from inflowing into a device and being diffused therein.

While the present disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

INDUSTRIAL APPLICABILITY

The present disclosure may be used for a device to receive data from a plurality of peripheral devices.

The invention claimed is:

1. A data receiving method of a device, the data receiving method comprising:
   receiving current data from any one peripheral device of a plurality of peripheral devices;
   determining whether the received current data is normal data;
   calculating a probability that next data is normal data, on the basis of a result of the determination; and
   determining whether to receive the next data according to the calculated probability,
   wherein the next data is data transmitted by the any one peripheral device or another peripheral device, and
   wherein a probability $\Phi(t+1)$ that the next data is normal data is calculated by an equation $$\Phi(t+1)=\min\{1,a^*\Phi(t)^*\exp(\Theta_1)+(1-a)^*\Phi(t)^* \exp(\Theta_2)\}, \quad \text{[Equation]}$$

$\Phi(t)$ is a probability that the current data is normal data, $\theta 1$ is a first coefficient to adjust an increase rate of $\Phi(t+1)$ of $\Phi(t)$, $\theta 2$ is a second coefficient to adjust a decrease rate of $\Phi(t+1)$ to $\Phi(t)$, and "a" is a third coefficient having a value of 1 when the data determination unit determines the current data to be normal data, and a value of 0 when the data determination unit determines the current data to be abnormal data.

2. The data receiving method of claim 1, further comprising
calculating the first coefficient θ1 by performing a learning that gives a reward when normal data is received from the plurality of peripheral devices.

3. The data receiving method of claim 2, wherein
the calculating of the first coefficient θ1 comprises:
a first operation of setting a value of the first coefficient θ1;
a second operation of sequentially receiving data from a plurality of peripheral devices, with respect to the set first coefficient θ1, and performing an episode of giving a reward when the received data is normal data and a penalty when the received data is abnormal data;
a third operation of producing a score by integrally calculating the reward and the penalty;
a fourth operation of repeating a process from the first operation to the third operation multiple times; and
a fifth operation of outputting a value of the first coefficient θ1 set at a state when an optimal score is produced for the episode, among a plurality of states.

4. The data receiving method of claim 1, wherein
the device performs communication with the plurality of peripheral devices in an IoT environment.

5. A device for receiving data from a plurality of peripheral devices,
the device comprising:
a data receiving unit configured to receive current data from any one peripheral device of the plurality of peripheral devices;
a data determination unit configured to determine whether the received current data is normal data;
a data prediction unit configured to calculate a probability that next data is normal data, on the basis of a result of the determination; and
a data receiving determination unit configured to determine whether to receive the next data according to the calculated probability,
wherein the next data is data transmitted by the any one peripheral device or another peripheral device, and
wherein the data prediction unit calculates a probability $\Phi(t+1)$ that the next data is normal data by an equation $$\Phi(t+1)=\min\{1, a*\Phi(t)*\exp(\Theta_1)+(1-a)*\Phi(t)*\exp(\Theta_2)\}, \quad \text{[Equation]}$$

$\Phi(t)$ is a probability that the current data is normal data, θ1 is a first coefficient to adjust an increase rate of $\Phi(t+1)$ of $\Phi(t)$, θ2 is a second coefficient to adjust a decrease rate of $\Phi(t+1)$ to $\Phi(t)$, and "a" is a third coefficient having a value of 1 when the data determination unit determines the current data to be normal data, and a value of 0 when the data determination unit determines the current data to be abnormal data.

6. The device of claim 5, wherein
the data determination unit
determines whether the current data is normal data by comparing the current data with previously received data.

7. The device of claim 5, wherein
the data determination unit
determines the current data to be abnormal data when the current data is defective data that needs recovery.

8. The device of claim 5, wherein
the first coefficient θ1 is a positive value, and the second coefficient θ2 is a constant having a negative value.

9. The device of claim 5, wherein
the first coefficient θ1 is a value selected to have a maximum reward according to a learning that gives a reward when normal data is received from the plurality of peripheral devices.

10. The device of claim 5, wherein
the data receiving determination unit
determines to receive the next data when the calculated probability has a value greater than or equal to a reference value,
or otherwise not to receive the next data, and
the reference value is a value randomly generated in a range from 0 to 1 each time when the data receiving determination unit determines whether to receive the next data.

11. A device for receiving data from a plurality of peripheral devices,
the device comprising:
a data receiving unit configured to receive current data from any one peripheral device of the plurality of peripheral devices;
a data determination unit configured to determine whether the received current data is normal data;
a data prediction unit configured to calculate a probability that next data is normal data, on the basis of a result of the determination; and
a data receiving determination unit configured to determine whether to receive the next data according to the calculated probability,
wherein the next data is data transmitted by the any one peripheral device or another peripheral device,
wherein
the data prediction unit,
when the data receiving determination unit determines not to receive the next data,
sets a probability that data after the next data is normal data to be identical to a probability that the next data is normal data.

12. The device of claim 11, wherein
the data receiving unit performs a communication directly with the plurality of peripheral devices.

13. The device of claim 11, performing
communication with the plurality of peripheral devices in an IoT environment.

* * * * *